United States Patent [19]
Strand

[11] Patent Number: 5,939,620
[45] Date of Patent: Aug. 17, 1999

[54] LEAK DETECTING DEVICE FOR DETECTING A LEAK IN A CONTAINER

[75] Inventor: Edward J. Strand, Douglasville, Ga.

[73] Assignee: Crown Cork & Seal Technologies Coporation, Alsip, Ill.

[21] Appl. No.: 09/066,517

[22] Filed: Apr. 24, 1998

[51] Int. Cl.$^6$ .............................. G01M 3/04; G01M 3/32
[52] U.S. Cl. ..................... 73/49.2; 73/45; 73/40
[58] Field of Search ............ 73/49.2 T, 49.2 R, 73/45, 41, 40

[56] References Cited

U.S. PATENT DOCUMENTS

| | | | |
|---|---|---|---|
| 1,754,321 | 4/1930 | Johnson | 73/45.3 |
| 3,010,310 | 11/1961 | Rowe | 73/45 |
| 3,495,441 | 2/1970 | Laub | 73/45.2 |
| 3,683,677 | 8/1972 | Harris | 73/49.2 |
| 3,728,063 | 4/1973 | Langecker | 452/326 B |
| 3,762,213 | 10/1973 | Nowicki | 73/45.3 |
| 3,805,593 | 4/1974 | Sandoz et al. | 73/49.2 |
| 3,815,248 | 6/1974 | Kulig | 33/174 L |
| 3,995,473 | 12/1976 | Flamand et al. | 73/49.2 |
| 4,019,370 | 4/1977 | Allocco, Jr. | 73/45.1 |
| 4,033,172 | 7/1977 | Flamand | 73/45.1 |
| 4,061,014 | 12/1977 | Bott et al. | 73/45.1 |
| 4,218,913 | 8/1980 | Comfort | 73/45.2 |
| 4,291,573 | 9/1981 | Richter et al. | 73/37 |
| 4,292,839 | 10/1981 | Hartness | 73/49.2 |
| 4,708,014 | 11/1987 | Janitz | 73/37 |
| 4,768,372 | 9/1988 | Lehmann | 73/49.2 |
| 4,788,850 | 12/1988 | Buschor et al. | 73/49.2 |
| 4,852,415 | 8/1989 | Bogatzki et al. | 73/865.8 |
| 4,942,758 | 7/1990 | Cofield | 73/49.2 |
| 5,025,657 | 6/1991 | Schenk | 73/49.2 |
| 5,317,902 | 6/1994 | Stieger et al. | 73/49.2 |
| 5,319,957 | 6/1994 | Steiger et al. | 73/49.2 |
| 5,591,899 | 1/1997 | Griesbeck | 73/41 |
| 5,668,307 | 9/1997 | Wade | 73/40.7 |

FOREIGN PATENT DOCUMENTS 1575585   7/1969   France.

*Primary Examiner*—Hezron Williams
*Assistant Examiner*—J. David Wiggins
*Attorney, Agent, or Firm*—Woodcock Washburn Kurtz Mackiewicz & Norris LLP

[57] ABSTRACT

A leak detection system determines whether a container has a leak or an aperture by attempting to draw a vacuum in the container and determining whether a vacuum has been created in the container. If a vacuum can be created in a container, this indicates that the container has a leak. Conversely if a vacuum cannot be created in the container, this indicates that the container does not have a leak. The leak detection system preferably includes a conveyor system for moving a container and a sensor for sensing the pressure in the interior of the container through an opening in the top of the container. While the sensor is sensing the pressure in the interior of the container, a vacuum pump pulls air from the region around the exterior of the container. If the container has an aperture, a vacuum will be created in the container and will be noted by the sensor. Conversely, if the container does not have an aperture, a vacuum will not be created within the container and the sensor will determine this by noting that the pressure of the container is above a predetermined pressure limit. This sensor determines that the container has an aperture by noting that the vacuum in the container is greater in magnitude than a predetermined pressure limit. The leak detection system of this invention may further include a reject assembly for rejecting a container that is detected by the sensor to have an aperture and a controller for controlling the reject assembly in response to signals from the sensor.

21 Claims, 6 Drawing Sheets

LEAK DETECTING DEVICE FOR DETECTING A LEAK IN A CONTAINER

BACKGROUND OF THE INVENTION

This invention relates to methods and systems for determining whether containers have apertures or leaks by trying to create a vacuum in the containers.

Prior art systems and methods for determining whether a container has an aperture or leak generally include a means for pressurizing a container and a means for measuring the ability of the container to maintain a pressure. More particularly, these systems and methods may include either a star wheel system or a conveyor system for moving containers. These systems and methods may also include a compressor or other device for directing the flow of a pressurized fluid into the container, and a measuring device for measuring the pressure inside the container once it is filled with pressurized fluid. In most applications, the pressurized fluid is air. After determining the pressure inside of the container, the measuring device typically communicates with a controller for determining whether the pressure of the fluid in the container exceeds a predetermined value. If the pressure of the interior of the container exceeds a predetermined value, this indicates that the pressurized fluid has been retained in the container and that the container does not have an aperture. Conversely, if the pressure of the inside of the container is below the predetermined value, this indicates that the container has an aperture or leak.

As an alternative to detecting leaks with compressed air, systems and methods for detecting leaks in a container by determining whether a container can hold a vacuum have also been developed. Similar to the pressurized air systems, the vacuum type systems draw a vacuum in the container and then test the ability of the container to maintain a vacuum. If a container cannot hold a vacuum, this indicates that it has a leak, and conversely if a container can hold a vacuum, this indicates that the container does not have a leak. Examples of such systems are disclosed in U.S. Pat. Nos. 3,762,213 (Nowicki) and 5,025,657 (Schenk). Nowicki teaches that a vacuum can be created in a container by moving a cam driven diaphragm that is attached to the top of a container that is riding on a conveyor belt. Assuming that a container does not have a leak, a vacuum is created within the container, as the diaphragm moves. If a vacuum is created in the container, the system of Nowicki raises the container off of the belt for a predetermined period of time and this indicates that the container does not have a leak. However, if the system is unable to hold the container for the predetermined of time in a raised position, this indicates that the container cannot hold a vacuum and has a leak. Similarly, Schenk teaches evacuating a container with a vacuum pump and then applying a pressure to the exterior of the container to determine whether the container can maintain a vacuum. If the container maintains a vacuum, this indicates that the container does not have a leak, and if the container does not maintain a vacuum this indicates that the container does have a leak.

As described above, a variety of pressurized air and vacuum systems for detecting the presence of a leak in a container have been developed. Many of these systems cover the top of a container with a port through which pressurized air can be directed into the container or a vacuum can be drawn in the container. Typically, this port is sealed to the top of the container. A pressure detector is generally placed in communication with the port to measure the pressure or vacuum within the container. The pressure or vacuum in the container may be measured after a predetermined period of time. This measured pressure or vacuum is compared to a predetermined pressure that a container having no leaks should have after it has been pressurized or depressurized for the predetermined period of time. If the container maintains the pressure or the vacuum for the predetermined period of time, this indicates that the container does not have a leak. Conversely, if the container is unable to maintain the requisite pressure for a predetermined period of time, this indicates that the container has a leak.

This invention relates to improved systems and methods for detecting leaks in containers. This invention also relates to improved systems and methods for detecting leaks in containers by determining if a vacuum can be created within a container.

SUMMARY OF THE INVENTION

The leak detection system of this invention preferably determines whether a container has a leak or an aperture by attempting to draw a vacuum in the container and determining whether a vacuum has been created in the container. If a vacuum can be created in the container, this indicates that the container has a leak. Conversely, if a vacuum cannot be created in the container, this indicates that the container does not have a leak.

Preferably, the leak detection system may be used to detect a leak in a container that has a first side that has an opening and a second side. It is intended that the second side of the container does not have any apertures or leaks and that the system of this invention can be used to detect whether the second side of the container has any leaks. The first side of the container may be the top of the container, and the second side of the container may be the bottom of the container. Preferably, the second side of the container has a plurality of feet for supporting the container. In order to accomplish the method of this invention, the leak detection system of this invention may have a conveyor for moving the container, as the second side of the container rests on a belt of the conveyor. In addition, the leak detection system may also have a sensor that has a probe, a sensor mounting block in which the sensor is disposed, and a fluid flowing device, such as a vacuum pump, for directing a fluid to flow from an area around the container when the probe is disposed proximal to the opening in the container.

In operation the conveyor moves the container to the sensor mounting block. Once the container is disposed beneath the sensor mounting block, the probe of the sensor is placed in fluid communication with the interior of the container. The vacuum pump pulls fluid, which is preferably air, from the area around the container. As the vacuum pump pulls air, it is attempting to create a vacuum in the container. A vacuum in the container will be created only if the container has an aperture or leak through which air can be pulled out of the container. The sensor attached to the probe determines whether a vacuum has been created in the container by measuring the pressure, in the interior in the container. If the vacuum is above the magnitude of a predetermined pressure, this indicates that the container has a leak or an aperture.

The leak detection system may further include a reject assembly for rejecting a container that is determined to have an aperture and a controller for controlling the reject assembly in response to the sensor. Preferably, the sensor is in electrical communication with the controller and causes the controller to activate the reject assembly to reject each container that is detected to have a leak.

Other features of the invention are described below.

DETAILED DESCRIPTION OF THE PREFERRED EMBODIMENTS

Figure 1:
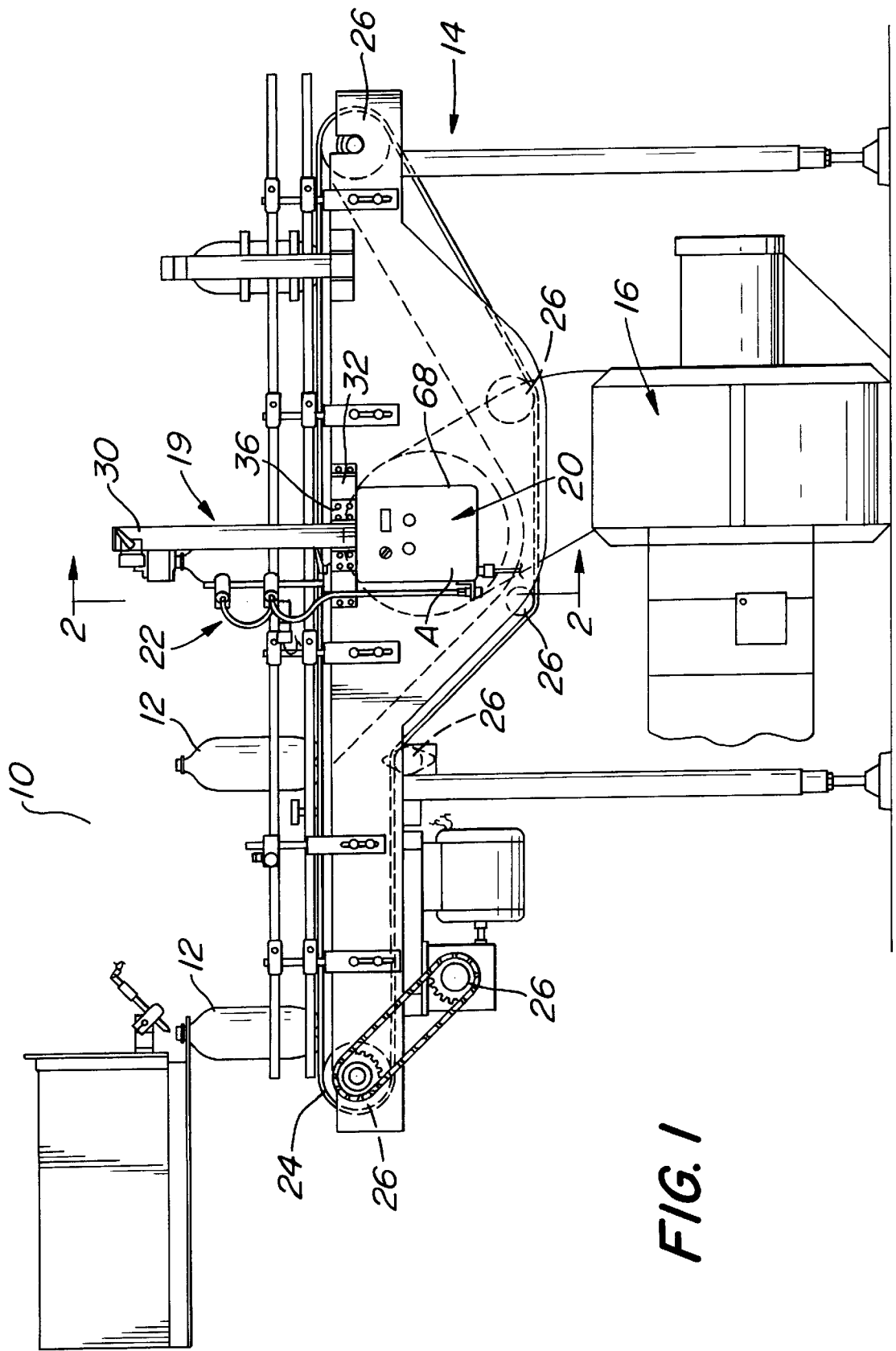
FIG. 1 is a diagrammatical view of a preferred embodiment of the system of this invention.
Figure 2:
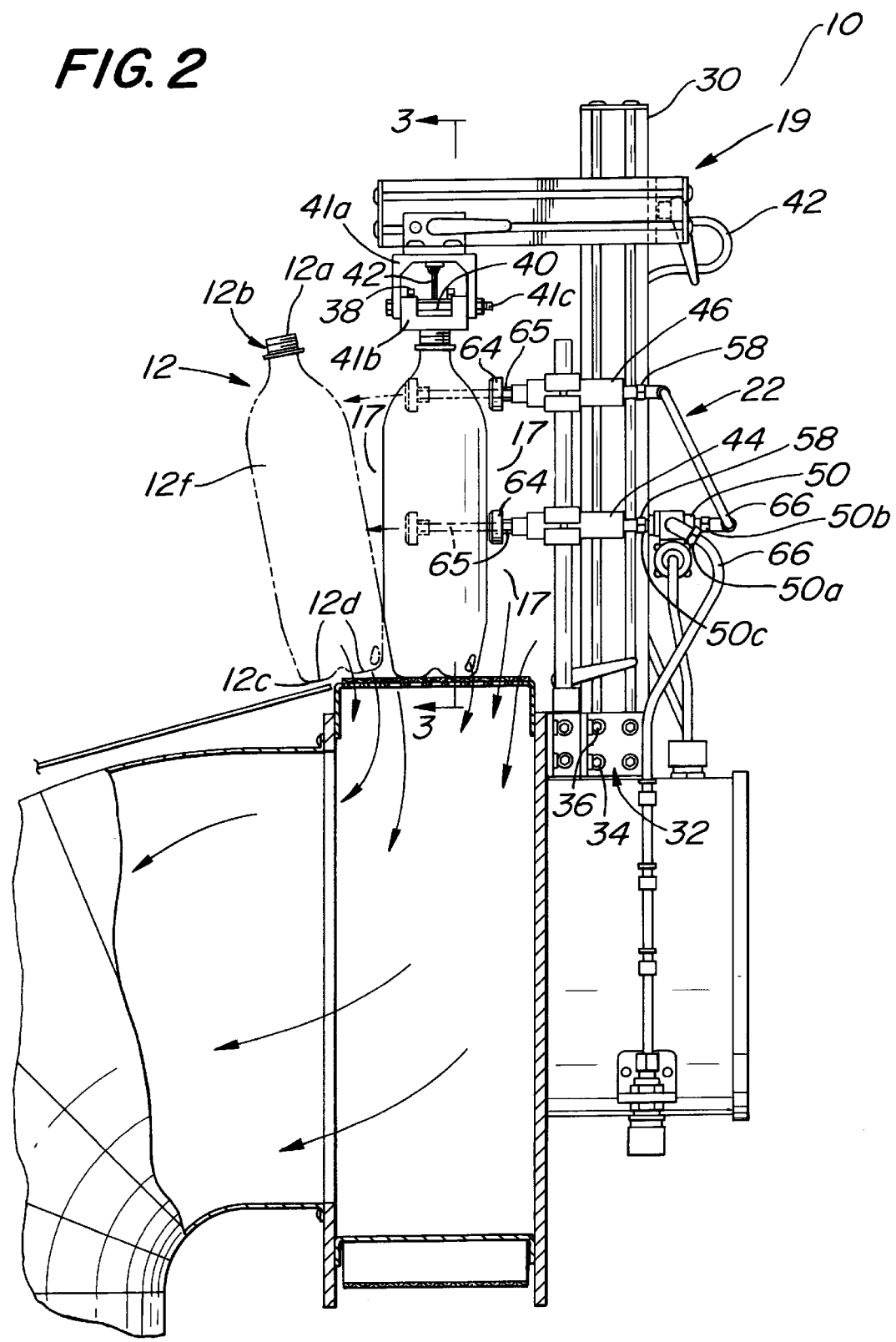
FIG. 2 is a cross-sectional view taken along line 2—2 of FIG. 1.
Figure 3:
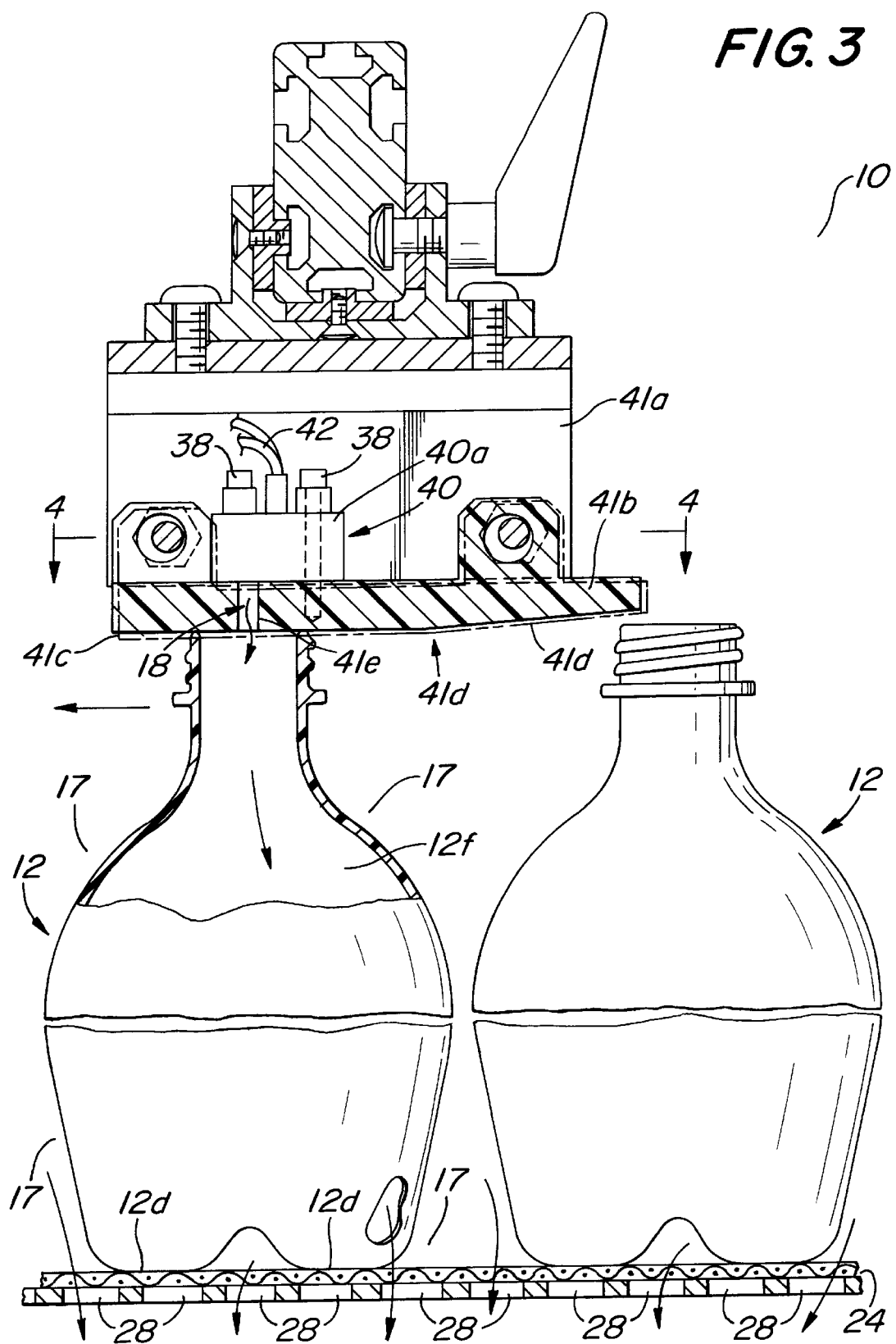
FIG. 3 is a cross-sectional view taken along line 3—3 of FIG. 2.

FIGS. 1–3 illustrate a portion of a preferred embodiment of the system 10 of this invention for detecting a leak or an aperture in a container 12. By way of overview, the leak detection system 10 of this invention detects leaks in containers by attempting to create a vacuum in a container. In a preferred embodiment, the system 10 determines whether a vacuum can be created in the containers by attempting to pull or draw air out of the interior of the container. If a vacuum can be created in the container, this indicates that the container has a leak. Conversely, if a vacuum cannot be created in the container, this indicates that the container does not have a leak.

This system may be employed with a variety of containers 12. In a preferred embodiment of this invention, the system 10 can be used to detect leaks or apertures in containers 12 that take the shape of a bottle, as shown in FIG. 2, and that have a desired opening 12a on a first side 12b, and even more preferably to plastic bottles. The container 12 with which this invention may be employed may also have a second side 12c. The first side 12b of the container 12 may be the top of the container 12, and the second side 12c of the container may be the bottom of the container 12. The second side 12c of the container may have a plurality of feet 12d for supporting the container 12. In a container of this type, it is not intended that the container 12 has any apertures other than the opening 12 in the first side 12b of the container. Although the container 12 shown in FIG. 2 has been described, it is not intended that this invention be limited to detecting leaks in containers of this type. Rather, it is intended that this invention be employed to test a variety of types of containers for leaks, and the container 12, shown in FIG. 2, is provided for illustrative purposes. When used with the container 12, as shown in FIG. 2, the leak detection system 10 of this invention may be used to find leaks in the container 12 and in particular the feet 12d of the container. Experience has shown that the feet 12d of the container 12 are an area that is susceptible to developing a leak during the manufacturing process of the container.

Figure 4:
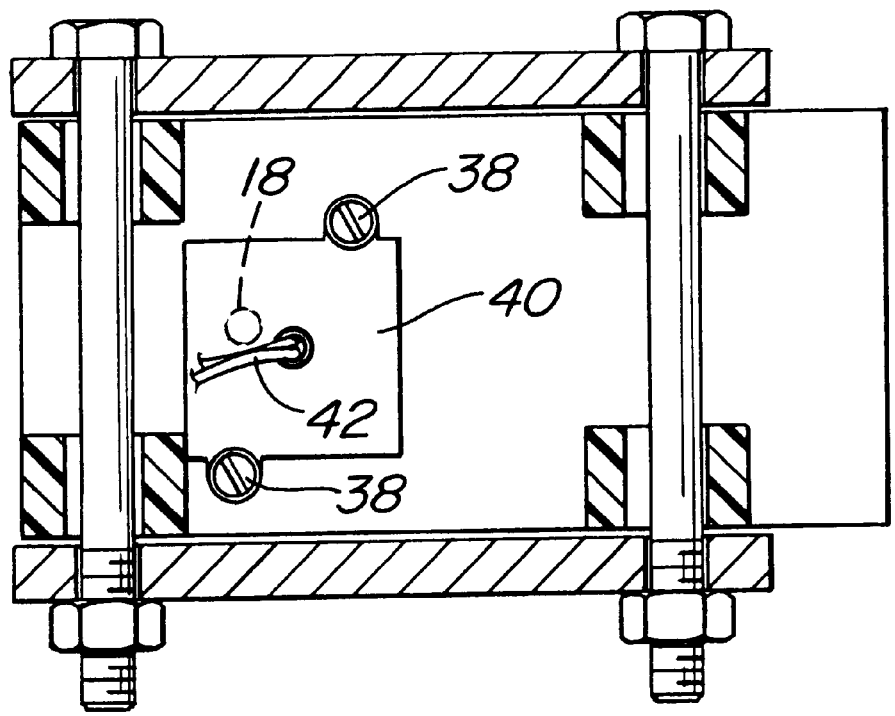
FIG. 4 is a cross-sectional view taken along line 4—4 of FIG. 3.
Figure 5:
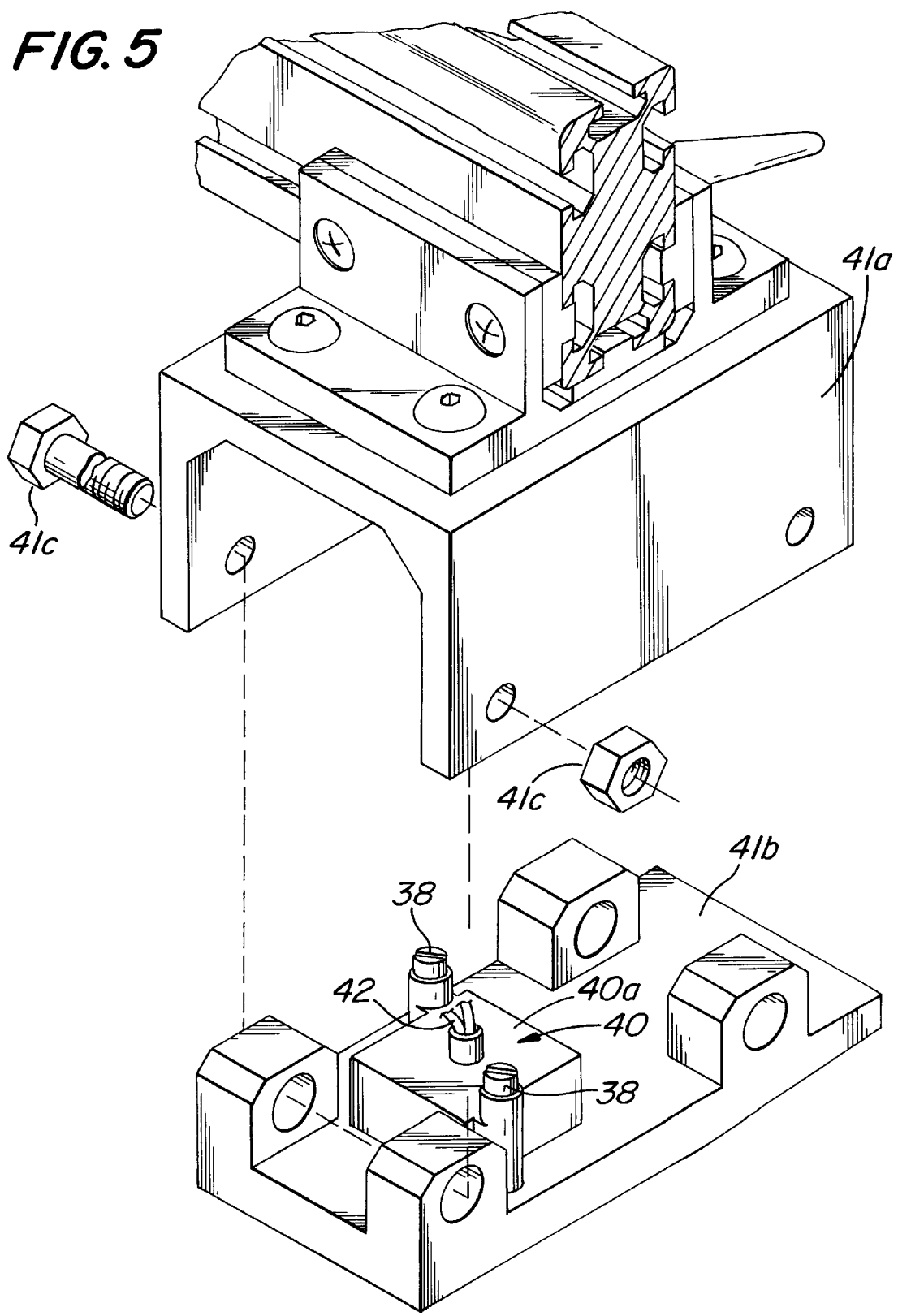
FIG. 5 is a diagrammatical view of a portion of the preferred embodiment depicted in FIG. 1.

As shown in FIGS. 1–3, the leak detection system 10 generally includes a conveying system 14, a vacuum pump 16, a probe 18, a frame assembly 19 and a controller 20. In addition, the leak detection system may also include a reject assembly 22. A portion of some of these components is also illustrated in FIGS. 4 and 5. The leak detection system 10 may be included within a manufacturing facility that manufacturers containers and may be used for quality control purposes to ensure that the manufactured containers do not have leaks. When employed in a manufacturing facility, the leak detection system is one system that is involved in the manufacturing process and may be employed following the formation of the containers.

The conveying system 14 can be used to move the containers 12. Preferably, the conveying system 14 may have a belt 24 upon which the containers 12 rest as the conveying system 14 moves the containers. The belt 24 may be moved in a rotary manner as is conventional with conveyor systems in order to move the containers. In order to drive the belt 24, the conveying system may have rollers 26 that may be motor driven. As the rollers 26 rotate, the belt 24 may ride around the rollers. Although the rollers 26 may be powered in a number of ways, in a preferred embodiment of this invention, the rollers 26 are motor driven. As described in more detail below, in order to detect whether the containers 12 resting on the belt 24 have leaks and to hold the containers on the belt 24, the belt 24 may have a plurality of holes 28, as best seen in FIG. 3.

A vacuum pump 16 or other suitable device, such as a blower, may be disposed below the belt 24. In a preferred embodiment, the vacuum pump 16 may be of a conventional type. In a preferred embodiment, the vacuum pump can produce a vacuum of 5–7 inches of water at about the point "A" labeled in FIG. 1. A variety of other vacuum pumps may be used with this invention, and it is not intended that this invention be limited to one design. This vacuum pump is provided for illustrative purposes and the pump ratings may vary depending on the intended application of the leak detection system 10. As described in further detail below, the vacuum pump 16 is employed in the leak detecting system 10 of this invention to attempt to create a vacuum in a container by pulling fluid from an area 17 around the container 12 and attempting to pull air out of the interior of the container.

The frame assembly 19 may have a post 30 and a mounting block 32, as depicted in FIG. 2. The post 30 and the mounting block 32 are preferably formed from a metal alloy, such as a steel alloy. The post 30 is preferably mounted to the mounting block 32 with brackets 34 and bolts 36. However, the post 30 and the block 32 may be mounted together with a variety of fastening techniques including, but not limited to, using other fasteners and welding. The post 30 forms the portion of the frame assembly 19 to which the probe 18, of the sensor 40 shown in FIG. 3, can be mounted, so that it can interface with the opening 12a in the container 12. The mounting block 32 provides the structure for mounting the frame assembly 19 to the controller 20 and for supporting the reject assembly 22, as shown in FIGS. 1 and 2.

The probe 18 may be coupled to a sensor 40, such as a pressure switch. Preferably, the pressure switch is a vacuum switch, which is best shown in FIGS. 3–5. In a preferred embodiment, the probe is integrally informed with the casing 40a of the pressure switch 40. Although any suitable vacuum switch 40 that is suitable for the desired application may be employed, in a preferred embodiment the vacuum switch 40 is a PSF-102 series pressure switch that is calibrated at 0.1 in. of water. Even more preferably, the pressure switch 40 is manufactured by World Magnetics of Traverse City, Michigan and is designated as part no. 7162-710.

As is best shown in FIG. 2, the probe 18 and the sensor 40 may be mounted to the frame assembly 19 in a variety of manners. In a preferred embodiment, the sensor 40 is mounted to the sensor mounting block 41 of the frame assembly 19 with bolts 38, as best shown in FIG. 5.

Preferably when the sensor 40 is mounted to the sensor mounting block 41, the probe 18 may be disposed proximal to the path of the opening 12a in the top of the container 12 "follows as the container moves on the conveyor", as shown in FIGS. 2 and 3.

The probe 18 may have a hollow bore so that when the probe 18 is disposed proximal to the path of the opening 12c of a container 12, the bore places the interior 12f of the container in fluid communication with the sensor 40. When in fluid communication with the interior 12f of the container 12, the sensor 40 can detect the pressure in the interior of the container. The sensor 40 may be in electrical communication with the controller 20, so that the sensor 40 can be used to determine if a vacuum has been drawn in a container and communicate this to the controller, and described below. A wire 42 may be used to place the sensor 40 in electrical communication with the controller 20.

The sensor mounting block 41 preferably includes a casing 41a and a bottom 41b that are fastened together to enclose the sensor 40. A variety of fastening techniques may be employed to fasten the casing 41a to the bottom 41b. In the preferred embodiment shown, the casing 41a and the bottom 41b are fastened with threaded fasteners 41c.

The bottom 41b of the mounting block 41 may have a surface 41d for contacting a container 12, and in particular to a top of a container 12. The bottom 41b may have a first portion 41c and a second portion 41d. The first portion 41c is preferably substantially parallel to the conveyor, and the second portion 41d is preferably tapered (disposed at an angle to the first portion) with respect to the first portion. The second portion 41d is preferably disposed proximal to the direction of motion of the containers on the belt. The probe 18 extends through an opening 41e in the sensor mounting block 41 and through the first portion 41c of the sensor mounting block 41.

In order to test the container for leaks, the sensor 40 may sense the pressure in the interior 12f of the container 12 and compare the pressure of the interior 12f of the container to a predetermined pressure limit. If the pressure is greater in magnitude than a predetermined pressure limit, this indicates that the container has a leak. Even more specifically, if the sensor senses that the container has a vacuum that is greater than a predetermined pressure or vacuum limit, this indicates that the container has a leak.

In further detail, testing the container 12 for leaks includes placing the second side of the container on the belt 24 of the conveyor system. The belt 24 moves the opening in the top of container 12 into proximity with the sensor mounting block 41. As the belt 24 is moving, the vacuum pump 16 disposed below the belt is operating. As the container is moving on the conveyor, the vacuum pump 16 holds the container 12 upright on the belt 24 by creating a negative pressure proximal to the belt pulling fluid, or air, through the holes in the conveyor belt 24 and from the area 17 around the container 12. When the container 12 reaches the second portion 41d of the sensor mounting block 41, the container slides below the second portion 41d, as best understood with reference to FIG. 3. The top of the container contacts the sensor mounting block 41 and slides below the first portion 41c of the bottom 41b sensor mounting block 41. Depending on manufacturing tolerances, the top of the container may contact either the first portion 41c or the second portion 41d of the sensor mounting block 41. Because the second portion 41d of the sensor mounting block 41 is tapered, it functions to slide the container 12 below the first portion 41c of the sensor mounting block 41. This is of particular importance when containers are slightly larger, because without this tapered second portion 41d, there is the potential that a slightly large container could contact the side of the sensor mounting block 41 and be toppled over rather than moving underneath the first portion of the sensor mounting block 41.

When the container 12 is under the first portion 41c of the sensor mounting block 41, a semi-seal is created between the first portion 41c and the top of the container 12. The seal is not a perfect seal, and the quality of the seal depends on manufacturing tolerances. The seal is sufficient so that a vaccum can be drawn in the container if it has a leak.

While the conveyor system is operating, the vacuum pump pulls fluid from the area 17 around the container 12. As the container 12 passes below the probe 18 as shown in FIG. 3, the sensor 40 senses the pressure of the inside of the container 12 and compares its magnitude to the predetermined pressure limit. If the container does not have a leak, the vacuum pump 16 will not pull air out of the container and a vacuum will not be created.

However, if the container 12 does have a leak, the vacuum pump 16 will pull air from the interior 12f of the container 12 and create a vacuum in the interior 12f of the container 12, as best shown in FIG. 3. The sensor 40 will sense that the pressure in the container 12 is greater in magnitude than the predetermined pressure limit. This indicates that the container has a leak. Thus, the system of this invention can determine if a container has a leak by trying to draw air out of a container and by determining whether a vacuum can be created or drawn in the container 12.

Since the vacuum pump 16 is pulling air from the second side of the container 12, which is in this instance the bottom of the container, the system of this invention is particularly aimed at detecting leaks in the bottom of the container, which may have a plurality of feet. However, the container 12 could be of another type that has multiple openings that are covered while a vacuum is attempted to be created in the container. Furthermore, the system of this invention could employ a plurality of vacuum pumps 16 that pull air from a variety of directions and thereby test each side of the container for leaks.

As alluded to above, the leak detection system 10 of this invention may also have a reject assembly 22 and a controller 20. As is best shown in FIG. 2, the reject assembly may include a pair of cylinders 44, 46, a block 48, a reject valve 50 and a rod 52. The rod 52 is preferably an alloy metal rod, such as a steel alloy. The rod 52 may be attached to the block 48, which is preferably an extruded metal alloy block, by any one of a number of known fastening techniques. In the embodiment shown, the rod 52 is attached to the block 48 with screws 54. The block 48 may be attached to the mounting block 22 of the frame assembly 19 in any one of a variety of manners, including by fastening the block 22 with threaded fasteners 56.

Each of the cylinders 44, 46 preferably has a clamping end 58 that defines a clamp. A bolt 60 may be employed to clamp the end 58 of each cylinder 44, 46 about the rod 52. The cylinders 44, 46 are preferably clamped on the rod 52 at a height so that they can reject a container 12 that is detected to have a leak.

Each of the cylinders 44, 46 may have a piston 65 that is moveable inside of the cylinders 44, 46 and that can be moved, as showed in dashed lines in FIG. 2 in order to reject a container 12 by pushing it off of the conveyor belt 24. The pistons 65 are preferably pressurized or spring loaded to a first position and moveable to a second position in which they extend from the cylinders 44, 46 and move the eject pad 64 disposed on their ends to contact a container 12 and reject it. The eject pads 64 are preferably manufactured from aluminum. The eject pad 64 is also best seen in FIG. 2.

Preferably, the pistons 65 move in response to the supply and venting of a pressurized fluid, which may be air. In order to move the pistons 65 from their first position to their second positions, pressurized air is ported to one side of the piston 65. This causes the pistons 65 to move to reject a container 12. In order to move the pistons 65 back to their first positions, the pressurized air is vented from the pistons 65 and the pressure on the other side of the piston causes it to return to its first position.

In order to control the operation of the cylinders 44, 46, the reject assembly may have a reject valve 50. Preferably, the reject valve 50 is a three way valve that may be connected to the cylinders 44. The three way valve 50 is preferably a solenoid operated valve that is operated by the controller 20 as described below. The solenoid valve may be a ⅛ in. NPT 3-way valve manufactured by MAC and having the designation of part no. 111-CA. As shown in FIG. 2, the three way valve has three ports 50a, 50b, 50c. Two of the ports 50a, 50b are connected to conduits 66, which may be polyvinyl tubing. Another of the ports 50c is connected to the lower cylinder 44. The port 50a may be connected to the tubing that supplies pressurized air from an air source, for example a compressor (not shown), to the reject valve 50.

As described below, the operation of the reject valve 50 is controlled by the controller 20. In a first position, the reject valve 50 is in a vent position in which the supply port 50a is shut and pressurized air can not travel through the reject valve 50 to the pistons 65. In this position, the reject valve 50 is vented to atmosphere. When a container that has a leak is detected by the sensor 40, the controller 20 will cause the reject valve to be repositioned. When this occurs, the reject valve 50 repositions so that the supply port 50a is opened to place the ports 50b and 50c and a side of both of the pistons in fluid communication with the supply tubing. In this position, pressurized air is directed to a side of the pistons to cause the pistons 65 to reposition and reject the container as described above. After the container with the leak has been rejected, the controller 20 causes the reject valve 50 to reposition and back to its vent position and remove the sides of the pistons from being in fluid communication with the air supply. When the reject valve 50 repositions, the side of the pistons that had been pressurized is vented to atmosphere and this causes the pistons 65 to move back to their normally retracted position.

Figure 6:
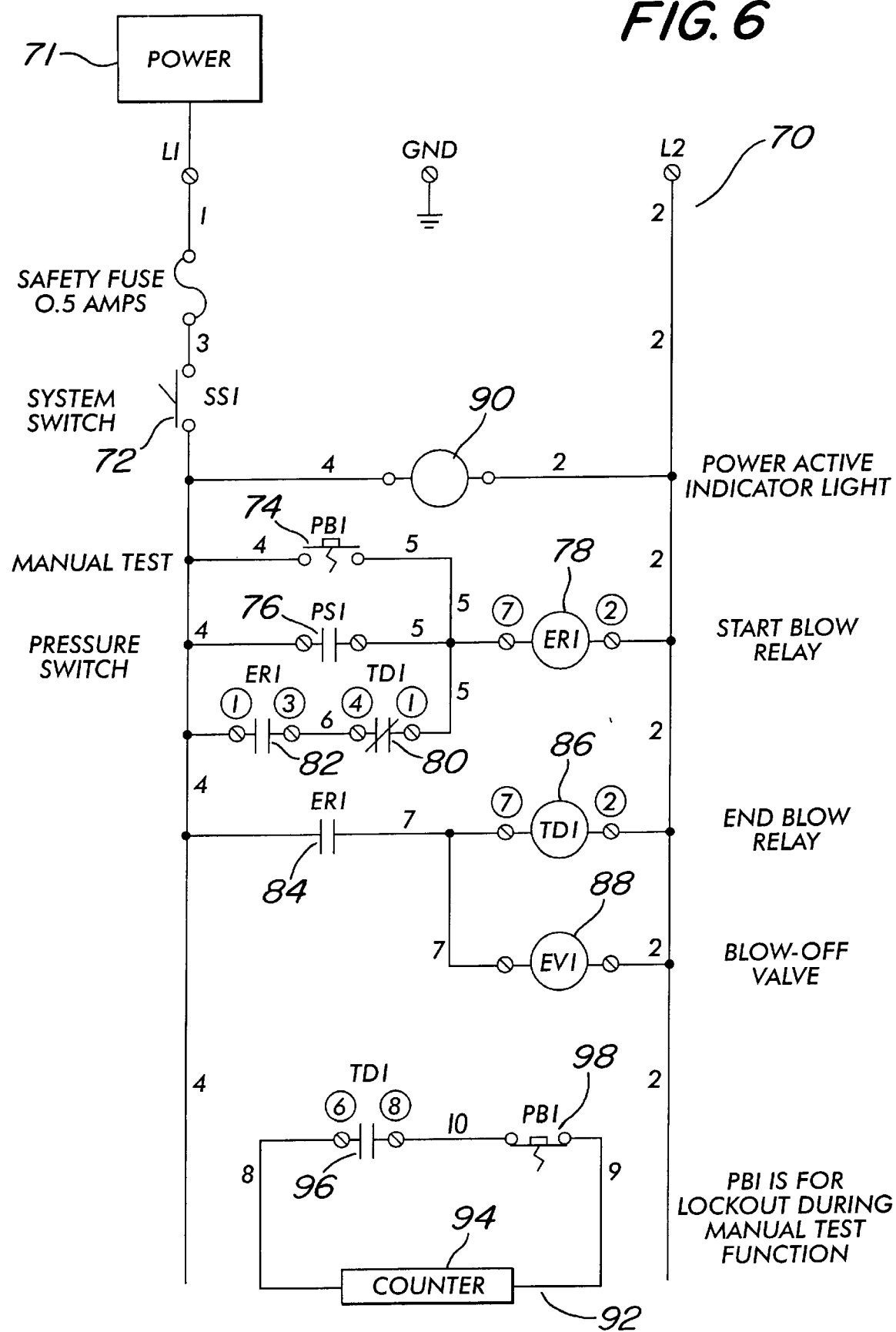
FIG. 6 is a schematic diagram of a control circuit for use with the embodiment of this invention show in FIG. 1.

The controller 20 may include a housing 68 and a control circuit 70 for controlling the operation of the reject assembly 22 based upon inputs from the sensor 40. The housing 68 is preferably connected to the mounting block 32 of the frame assembly 19 by any one of a variety of conventional fastening techniques. The housing 68 houses the control circuit 70, which preferably uses 110 VAC electrical power from a power source 71. As shown in FIG. 6, the control circuit 70 generally includes a power on switch 72, a test switch 74, a sensor or pressure switch contact 76, a control relay 78, a first time delay contact 80, a first control contact 82, a second control contact 84, a time delay relay 86 and a reject valve relay 88. These components are preferably electrically connected as shown in FIG. 6. However, they may be connected in a variety of ways that will result in the control of the reject assembly 22 in response to the sensor 40. Each of the contacts shown in FIG. 6 is shown in its deenergized state.

The purpose of the control circuit 70 is to control the operation of the reject assembly 22, and in particular the reject valve 50, in response to signals from the sensor 40. As described above, the sensor 40 senses the pressure in the interior of the container and compares the magnitude of the pressure to a predetermined pressure limit to determine if a vacuum, that is indicative of a leak, is present in the container. The sensor 40 is in electrical communication with the pressure switch contact 76, so that the pressure switch contact 76 shuts and opens in response to signals from the sensor 40. If the sensor 40 senses that the pressure limit in the interior of the container is indicative of a leak, the sensor 40 sends a signal to the pressure switch contact 76 to cause the pressure switch contact to close. Although not described above, the sensor 40 also detects when the pressure exceeds a predetermined reset pressure that is indicative of the sensor 40 not sensing a vacuum within a container. Thus, after the sensor 40 senses a vacuum in a container and sends a signal to cause the pressure switch contact 76 to close, the sensor determines when the pressure has exceeded the predetermined reset pressure limit and at this point causes the pressure switch contact 76 to move back to its open state. As described below, when the pressure switch contact 76 moves to its closed position, this causes the reject assembly 22, and in particular the reject valve 40 to be operated to reject the leaky container that has been detected. In a preferred embodiment of this invention, the predetermined limit at which the sensor 40 sends a signal to the pressure switch contact 76 to move to the closed position is about 0.1 inches of water, and the predetermined reset pressure limit at which the sensor 40 sends a signal to the pressure switch contact 76 to move to the open position is less than the predetermined limit that causes the pressures with contact 76 to close. Preferably, these limits or set points are adjustable with an adjusting screw 89 or the like disposed on the sensor 40.

Both of the control contacts, the first and the second control contacts 82, 84, are in electrical communication with the control relay 78, so that the control relay 78 controls whether they are in the open or closed position. Similarly, the time delay relay 86 controls the operation of the first time delay contact 80.

As shown, the test switch 74 is placed in parallel with both the pressure switch contact 76 and the first control contact 82 and the first time delay contact 80. The test switch 74, the pressure switch contact 76 and the combination of the first control contact 82 and the first time delay contact 80 are connected in parallel with the control relay 78 to control when the control relay 78 is energized. The second control contact 84 is connected in series with the time delay relay 86 and the reject valve relay 88, which are connected in parallel.

In operation the power switch 72 can be moved from an off position to an on position in which it supplies electrical power from the power source 71 to the control circuit 70. The control relay 78 will be energized when either of the following two events occur, either the test switch is activated or the pressure switch contact 76 is shut in response to a signal from the sensor 40, as described above. Thus, if the sensor 40 detects a vacuum in the container that is equal to or greater than the predetermined pressure limit, the pressure switch contact 76 will move to the closed position. After the pressure switch contact 76 closes, electrical power is supplied from the power source 71 through the pressure switch contact 76 to energize the control relay 78. Once energized, the control relay 78 causes the first control contact 82 and the second control contact 84 to move to their closed positions. In its closed position, the first control contact 82 enables power to be supplied from the power source 71 through the first control contact 82 and the normally shut first time delay contact 80 to energize the control relay 78. This keeps the control relay 78 powered after the pressure switch contact 76 opens upon receiving an opening signal from the sensor 40 when the predetermined reset limit is reached.

When the control relay 78 is energized as described above, the control relay 78 causes the second control contact 84 to move from its open position to its closed position. In its closed position, the second control contact provides electrical power form the power source 71 to the time delay relay 86 and the reject valve relay 88. By energizing the reject valve relay 88, the reject valve 50 changes position to cause the reject assembly 22 to reject a container 12. The rejected container is one that the sensor 40 has detected that has a vacuum that is above the predetermined pressure set point or limit.

When energized, the time delay relay 86 causes the first time delay relay 86 contact to move from its normally closed position to its open position. Because of the time delay associated with the time delay relay 86, the time delay relay 86 generally causes the first time delay relay contact 80 to move to the open position after a predetermined time delay. In a preferred embodiment of this invention, the time delay is about 0.1 seconds. The time delay provided for by the time delay relay 86 ensures that the control relay 78 will be powered long enough to provide power to the reject valve relay 88 and power the reject valve relay 88, so that the reject valve relay 88 can operate the reject valve 50.

After the first time delay contact 80 opens, electrical power is removed from the control relay 78 and its associated contacts, the first 82 and the second control contact 84 move to their normally opened position. When the second control contact 84 moves to its opened position, power is removed from the time delay relay 86 and the reject valve relay 88. By removing power from the reject valve relay 88, the reject valve solenoid is deenergized and the reject valve 50 moves to its initial position. When the time delay relay 86 is deenergized, the first time delay contact 80 shuts, so that it it ready to energize the control relay 78 when the sensor 40 detects the next container that has a pressure above the predetermine pressure limit.

In summary, the control circuit operates to control the reject valve 50 in response to the sensor 40. The sensor 40 ends a signal to the control circuit 70 when it detects a container 12 that has a vacuum that is greater than a predetermined limit or set point. This signal causes the control circuit 70 to power the reject valve 50 and thereby reject the container that had the leak. After the sensor 40 is disconnected from the leaky container and the magnitude of the pressure detected by the sensor 40 is less than or equal to a predetermined reset point, the control circuit 70 is reset so that it is ready to receive the next signal from the sensor 40 when it detects a leak in another container 12.

As shown in FIG. 6, the control circuit 70 may also have a power active light 90 that is powered when the power switch 72 is set to the on position. Further, the controller 20 may also have a counter circuit 92 that energizes a counter 94 that counts each container 12 that is rejected. A preferred embodiment of this counting circuit 92 is shown in FIG. 6 and includes a second time delay contact 96, a test button 98, and the counter 94. The counter 94 may be one of a variety of types including but not limited to an electrical mechanical counter or an electrical counter with an LED display. In a preferred embodiment, the counter 94 is one that is manufactured by Red Lion Controls of York, Pa. and is either a Cub 1 miniature electronic counter or a Cub 2 general purpose counter. As shown, in FIG. 6, the second time delay relay contact 96 is normally open. When the time delay relay 86 is energized, as described above, the second time delay contact 94 will shut and power will be provided to the counter 94 for amount of time sufficient to cause the counter 94 to count one unit.

As described above, the leak detection system 10 of this invention detects leaks in a container 12 and then rejects the container 12 if it detects the presence of an aperture or leak in the container 12. In order to accomplish this, the leak detection system 10 10 has a probe 18 that it coupled to a sensor 40 and mounted in a sensor mounting block 41. As a container 12 moves on the conveyor belt, the container 12 will reach the sensor mounting block 41 and becomes disposed below the probe 18. Once disposed below the probe 18, the interior of the container is in fluid communication with the sensor 40. The vacuum pump draws fluid from the area 17 around the container 12. Thus, if the container 12 has an aperture, the vacuum pump will draw air out of the interior of the container 12 and a vacuum will be created in the container 12. If a vacuum is created in the container, the sensor 40 will sense the vacuum being above the predetermined pressure limit and activate the controller 20 and in particular the pressure switch contact 76 of the control circuit 70. The controller 20 will respond to the sensor 40 by activating the reject assembly 22, as described above by activating the reject valve solenoid, to reject the container 12. In contrast, if the vacuum pump is unable to create a vacuum in the container 12, this indicates that the container 12 does not have a leak and the sensor 40 does not activate the controller 20 to activate the reject assembly 22.

Since the leak detection system 10 of this invention determines whether a container has a leak by attempting to draw a vacuum in the container by drawing air from the bottom of the container 12, it is most useful in determining whether a container has a leak or aperture in the bottom of the container or the direction in which the air is pulled. In a preferred embodiment of this invention, it is used with containers that have feet and is employed to determine if the container has a leak in the feet of the container.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed:

1. A system for detecting the presence of an unwanted aperture in a container that has an opening comprising:

a continuously moving air permeable conveyor for moving the container such that the container opening moves along a path;

a vacuum source in fluid communication with the conveyor for creating a negative pressure proximal to the air permeable conveyor; and a pressure sensor, mounted proximal to the path of the container opening so that the sensor is placed in fluid communication with the container opening as the container opening moves along the path, said sensor being operative to detect a pressure decrease within the moving container if the vacuum source pulls air through said unwanted aperture when the conveyor moves the container proximal to the sensor, thereby determining if the container has an unwanted aperture by determining the pressure decrease in the container.

2. The system of claim 1, wherein the pressure sensor further comprises a probe that has a hollow bore that places the sensor in fluid communication with the container opening as the conveyor moves the container along the path.

3. The system of claim 1, wherein the conveyor comprises an air permeable belt.

4. The system of claim 3, wherein the vacuum source is disposed beneath the air permeable belt.

5. The system of claim 1, further comprising a reject assembly that is coupled to the pressure sensor and that is operative to reject the container if the sensor detects the pressure decrease.

6. The system of claim 5, further comprising a controller, coupled to the pressure sensor and the reject assembly, that is operative to control the reject assembly in response to the sensor.

7. The system of claim 1, wherein the container has a bottom comprising a plurality of feet.

8. The system of claim 1, further comprising a stationary sensor mounting block in which the sensor is disposed and wherein the conveyor moves the container so that the opening of the container moves beneath the sensor mounting block while moving on the conveyor.

9. The system of claim 8, wherein the sensor mounting block comprises a probe that places the pressure sensor in fluid communication with an interior of the container through the opening in the container when the container passes beneath the sensor.

10. A system for detecting the presence of an unwanted aperture in a container that has a top that has a desired opening and a bottom, comprising:

a continuously moving conveyor that is operative to continuously move the container so that the desired opening moves along a path, the conveyor comprising a continuously moving belt that has an air permeable surface for supporting the bottom of the container;

a stationary pressure sensor, mounted proximal to the path of the desired opening, the pressure sensor being placed in fluid communication with the desired opening as the opening passes proximal to the sensor and if the container has the unwanted aperture, the pressure sensor being operative to detect a decrease in pressure within the container when the sensor is placed in fluid communication with the desired opening and while the container is moving; and a vacuum source, disposed in fluid communication with the air permeable surface and (i) being operative to create a negative pressure proximal to the air permeable surface and proximal to the container as the belt and the container pass proximal to the sensor and as the opening is placed in fluid communication with the pressure sensor and (ii) if the container has the unwanted aperture, being operative to pull air from within the container and through the unwanted aperture to create a decrease in pressure inside of the container that can be detected by the pressure sensor, when the container is placed in fluid communication with the pressure sensor and as the container is moving thereby determining if the container has an unwanted aperture by determining the pressure decrease in the container.

11. The system of claim 10, wherein the vacuum source comprises a vacuum pump.

12. The system of claim 10, wherein the belt comprises a plurality of holes that define the air permeable surface and through which the vacuum source pulls air to create a negative pressure proximal to the air permeable surface.

13. The system of claim 12, wherein the vacuum source comprises a vacuum pump that is disposed beneath the air permeable surface.

14. The system of claim 10, wherein the sensor comprises a vacuum switch.

15. The system of claim 10, further comprising a reject assembly, that is coupled to the sensor, and that is operative to reject the container in response to the sensor if the sensor detects the pressure decrease.

16. The system of claim 15, further comprising a controller, that is coupled to the pressure sensor and the reject assembly, the controller being operative to control the reject assembly in response to the sensor.

17. A method of detecting the presence of an unwanted aperture in a container that has an opening, comprising:

disposing the container on a continuously moving air permeable surface of a conveyor;

continuously moving the conveyor so that the opening passes proximal to a stationary pressure sensor, the opening being placed in fluid communication with the sensor as the container passes proximal to the pressure sensor;

pulling air with a vacuum source through the air permeable surface while the container passes proximal to the sensor, and if the container has the unwanted aperture, pulling air from within the container and through the unwanted aperture and thereby causing a decrease in pressure within the container while the sensor is in fluid communication with the container; and sensing a pressure within the container when the container is placed in fluid communication with the sensor and while the air permeable surface is continuously moving and if the container has the unwanted aperture detecting the decrease in pressure created by the vacuum source when the conveyor moves the container proximal to the sensor, thereby determining if the container has an unwanted aperture by determining the pressure decrease in the container.

18. The method of claim 15, wherein the vacuum source comprises a vacuum pump.

19. The method of claim 17, wherein the step of continuously moving further comprises moving the air permeable surface so that the container is disposed beneath a sensor mounting block in which the sensor is disposed.

20. The method of claim 17, further comprising the step of rejecting the container if the container is determined to have the unwanted aperture by activating a reject assembly, that is coupled to the pressure sensor, the reject assembly being operative to contact the container and knock the container off of the air permeable surface in response to the pressure sensor detecting the decrease in pressure.

21. The method of claim 20, wherein the step of sensing comprises sensing the pressure with a sensor that is in communication with a controller that controls the reject assembly to reject the container if the sensor detects the decrease in pressure within the container.

* * * * *